C. B. SWIFT.
TIRE COOLER.
APPLICATION FILED JAN. 26, 1912.
1,069,300.
Patented Aug. 5, 1913.
2 SHEETS—SHEET 1.
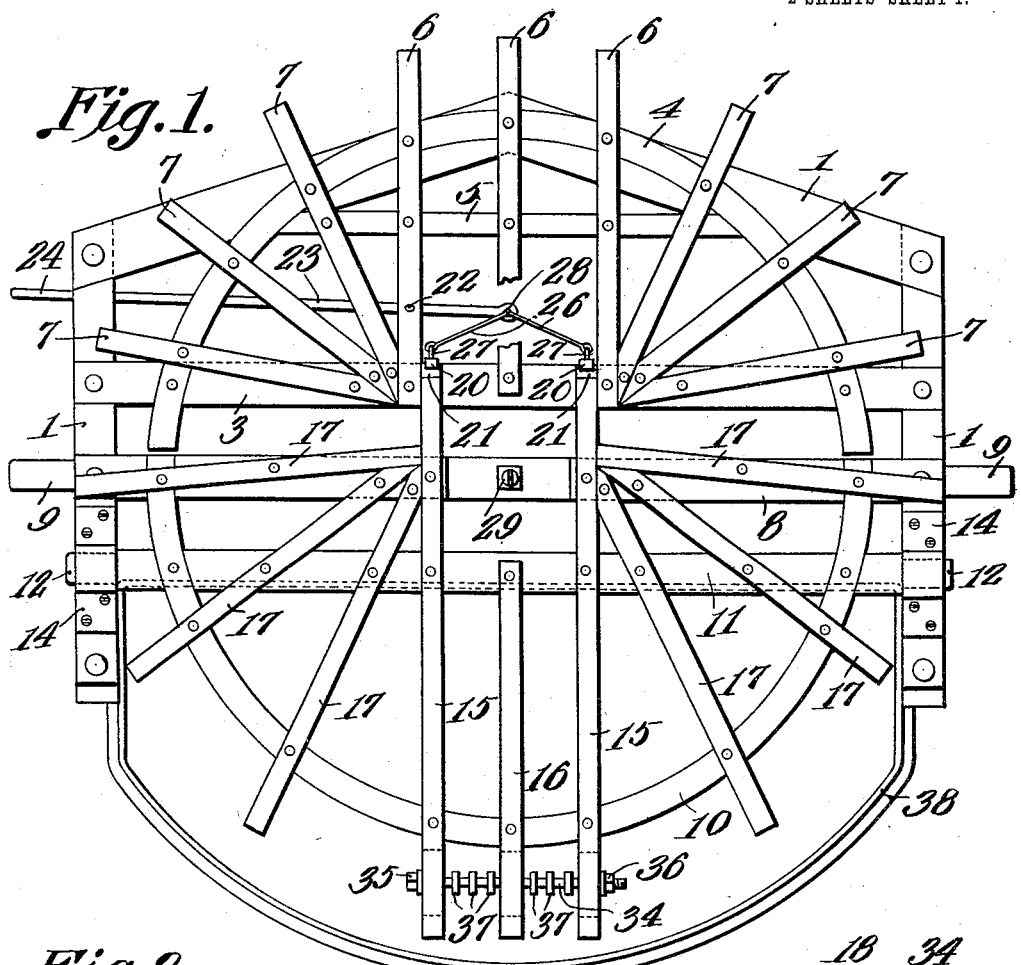
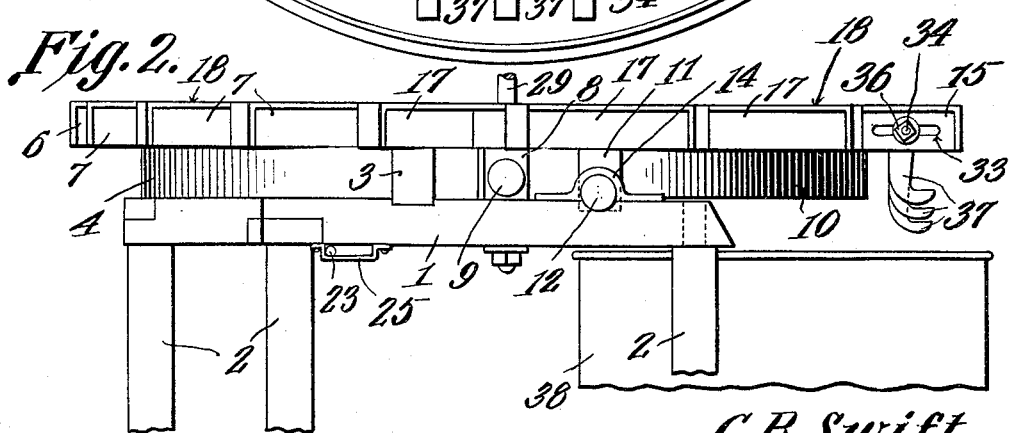
Witnesses
C. B. Swift,
Inventor
by C. A. Snow & Co.
Attorneys

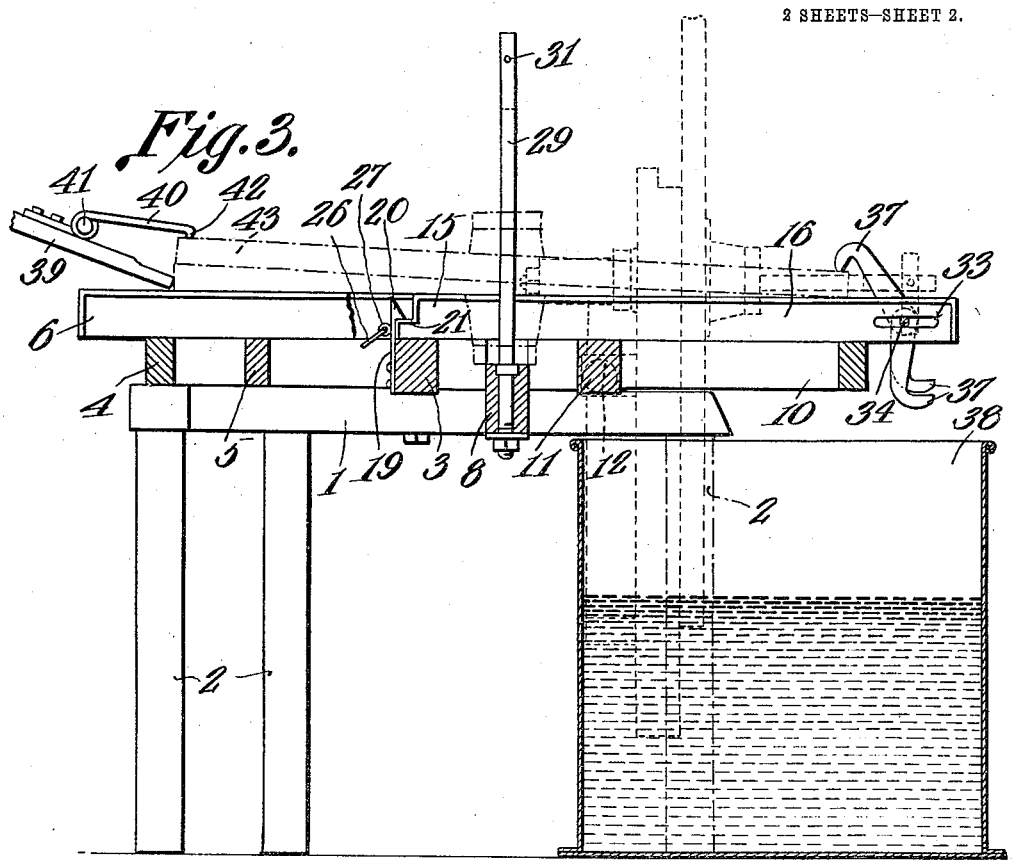
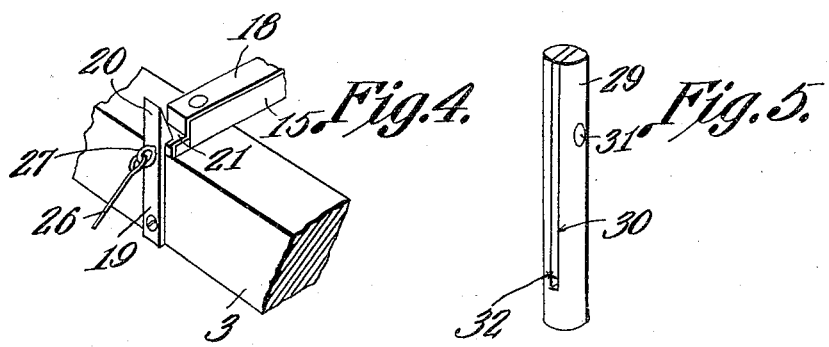

UNITED STATES PATENT OFFICE.

CHARLES B. SWIFT, OF CENTERVILLE, TENNESSEE.

TIRE-COOLER.

1,069,300.  Specification of Letters Patent.  Patented Aug. 5, 1913.

Application filed January 26, 1912. Serial No. 673,687.

*To all whom it may concern:*

Be it known that I, CHARLES B. SWIFT, a citizen of the United States, residing at Centerville, in the county of Hickman and State of Tennessee, have invented a new and useful Tire-Cooler, of which the following is a specification.

The device forming the subject-matter of this application, is adapted to be employed for setting and for cooling the tire of a wheel, and the invention aims to provide a table, consisting of a fixed, horizontal wheel-supporting portion, and a pivotally mounted wheel-carrying portion, the construction being such that the pivotally mounted wheel-carrying portion may be moved into an approximately vertical position, thereby to dispose the lower portion of the wheel in a tank, and to move the upper portion of the wheel away from the fixed part of the table, so that the upper portion of the wheel may be manipulated readily.

A further object of the invention is to provide novel means for holding the fixed and movable portions of the wheel-carrying table in approximate parallelism, and to provide adjustable means upon the movable portion of the table, for engaging the wheel, to prevent a rotation of the wheel upon the wheel-carrying spindle with which the movable portion of the table is equipped.

A further object of the invention is to improve generally, devices of the type to which the present invention appertains.

With the above and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a top plan; Fig. 2 is a side elevation; Fig. 3 is a transverse section; Fig. 4 is a detail perspective showing the latch mechanism whereby the fixed and movable portions of the wheel-carrying table are maintained in approximate parallelism; and Fig. 5 is a detail perspective of the end of the wheel-carrying spindle which is mounted upon the movable portion of the table, the view showing the latch mechanism whereby the wheel is held upon the spindle, when the movable portion of the table is vertically disposed.

In carrying out the invention there is provided a supporting structure, including a U-shaped frame 1, which may be supported upon legs 2. The supporting structure upholds the table upon which the wheel is mounted. This table includes a portion fixed with respect to the supporting structure, and a pivotally mounted portion, adapted to be swung into a vertical position, to permit the wheel, at its lower edge, to enter into a cooling tank.

The fixed portion of the wheel table includes a cross bar 3, secured to the frame 1, the cross bar 3 being intersected by a segment 4, which is also secured to the frame 1. The segment 4 is reinforced, in its intermediate portion, by a brace 5, preferably disposed parallel to the cross bar 3. Fixed to the cross bar 3, to the brace 5, and to the segment 4, are a series of parallel primary arms 6. Disposed upon both sides of the primary arms 6, are secondary radial arms 7, mounted similarly to the primary arms 6. From the foregoing it will be seen that the fixed portion of the wheel-holding table is of approximately semi-circular outline. The movable portion of the wheel-carrying table is likewise of approximately semi-circular contour, and includes a cross bar 8, corresponding to the cross bar 3, the cross bar 8 being terminally provided with outstanding handles 9, whereby the movable portion of the table may be tilted upon its pivotal mounting, to be described hereinafter. Terminally secured to the cross bar 8 is a segment 10, and secured to the segment 10, intermediate the outer end of the segment and the cross bar 8, is a shaft 11, parallel to the cross bar 8, and corresponding to the brace 5. The shaft 11 is equipped at its ends with trunnions 12, journaled for rotation in bearings 11 carried by the frame 1, adjacent the ends of the frame. The movable portion of the table, therefore, is fulcrumed intermediate its ends upon the frame 1, the construction being such that the movable portion of the table may be swung into an approximately vertical position, as will be understood readily. Secured to the cross bar 8, to the shaft 11, and to the segment 10 are primary arms 15, adapted, as will be clearly seen in Fig. 1, to overhang the cross bar 3 of the fixed portion of the wheel table. Located intermediate the primary arms 15, is a shorter primary arm 16 which, adjacent its inner end, terminates upon the shaft 11. Owing to the fact that the arm 16 terminates adjacent the shaft 11, the hub of the wheel is accommodated, as will be understood readily, when further details of the structure are disclosed. Located upon both sides of the longer primary arms 15 are radial secondary arms 17. At this point it may be stated that all of the arms upon both the fixed and movable portions of the wheel table may be equipped, upon their upper surfaces, with protecting irons 18, to prevent a burning of the structure, when a heated tire is applied to the wheel.

A means is provided for holding the fixed and movable portions of the wheel table in approximate parallelism, and horizontally disposed. This means includes one or more latches 19, of resilient construction, which, as shown to best advantage in Fig. 4, are connected to the cross bar 3 of the fixed portion of the wheel table, the latches 19 being equipped with heads 20, adapted to engage seats 21, formed in the inner ends of the primary arms 15 of the movable portions of the wheel table, which arms, as hereinbefore described, overhang the cross bar 3. Fulcrumed intermediate its ends, as shown at 22, upon one of the primary arms 6 of the fixed portion of the wheel table, is a lever 23, one end of which protrudes, as shown at 24, beyond the periphery of the frame 1, for manual manipulation. The end 24 of the lever 23 is slidably received within a depending guide 25, seen most clearly in Fig. 2, and secured to the under face of the frame 1. Flexible elements 26 are secured in eyes 27, attached to the outer faces of the latches 19, these flexible elements 26 being terminally connected, as shown at 28, with one end of the lever 23.

The movable portion of the wheel table carries means whereby the wheel may be journaled for rotation thereon. This means preferably includes a spindle 29, fixed to and projecting from the cross bar 8. Adjacent the free end, the spindle 29 is equipped with a longitudinal slot 30, across which extends a pivot element 31, upon which is fulcrumed, intermediate its ends, a detent 32. One segment of the detent is much longer than the other segment. The construction is such that when the movable portion of the table is parallel to the fixed portion thereof, as indicated in Fig. 2, the detent 32 will hang in approximate alinement with the spindle 29, as shown in Fig. 5. The wheel may then be readily mounted upon and removed from the spindle 29, without regard to the detent 32. When, however, the movable portion of the table is swung into an approximately vertical position, so as to dip into the tank, as shown in Fig. 3, the detent 32 will tilt gravitationally, so as to stand transversely of the spindle 29, the wheel being thereupon held for rotation upon the spindle.

A means is provided for preventing the wheel from rotating upon the spindle 29. In constructing this means, a series of slots 33 are fashioned in the arms 15 and 16 of the movable portion of the table, longitudinally of these arms. Located in the slots 33, is a supporting member, preferably taking the form of a bolt 34, having at one end a head 35, and provided at the other end with a clamping nut 36. Obviously, by loosening the nut 36, the supporting member 34 may be moved toward the spindle 29, and away from the spindle. Mounted to swing upon the bolt 34, are a number of wheel-engaging members 36, of different lengths, and preferably taking the form of hooks. Owing to the fact that the bolt 34 may be moved toward and away from the spindle 29, in the manner hereinbefore described, and owing to the fact that the wheel-engaging members 37 are of different lengths, it will be seen that wheels of different radii, may be held against rotation upon the spindle 29, the obvious function of the hooked wheel-engaging member 37 being to engage with the felly of the wheel.

In practical operation, while the tire is being placed upon the wheel, the fixed and movable portions of the table are disposed in alinement, and in horizontal relation, as shown in Fig. 3, the latches 19 being engaged with the ends of the primary arms 15 of the movable portion of the table, the wheel-engaging members 37, or one of them, being engaged with the felly. The tire, when heated, may be applied to the wheel through the instrumentality of a lever 39, to which is pivoted a tongue 40, as shown at 41, the tongue 40 carrying a finger 42, adapted to engage the inner face of the tire 43, as shown in Fig. 3.

When it is desired to cool the tire, the handle end 24 of the lever 23 is manipulated, tilting the lever upon its fulcrum 22, and actuating the flexible elements 26, whereupon the latches 19 will be disengaged from the inner ends of the primary arms 15 of the movable portion of the wheel table, permitting the wheel table and the wheel to tilt into an approximately vertical position, as shown in Fig. 3, so that the wheel may dip into the cooling tank 38.

As hereinbefore described, the detent 32 stands parallel to the spindle 29, when the spindle 29 is vertically disposed, the construction being such that the wheel may be placed upon the spindle 29, without interference from the detent 32. When, however, the movable portion of the wheel table is swung into a vertical position, as shown in Fig. 3, the detent 32 will tilt automatically, so as to stand transversely of the spindle 29, the wheel being held upon the spindle.

Owing to the fact that the table comprises a fixed portion and a movable portion, both sides of the wheel are free and unencumbered when, as shown in Fig. 3, the movable portion of the table is tilted into a vertical position, so that the wheel may enter the tank 38. The advantages incident to having both of the faces of the upper portion of the wheel unencumbered, when the wheel is in the position shown in Fig. 3, are obvious to persons skilled in the art.

Having thus described the invention, what is claimed is:—

In a tire handling device, a U-shaped frame comprising arms; supports for the frame, located adjacent the free ends of the arms; a shaft; a movable, wheel holding table secured intermediate its forward and rear ends to the shaft; the shaft extending across the space between the arms and being journaled for rotation on the arms to the rear of the supports, and the arms being spaced to receive a table-held wheel therebetween, whereby the wheel may assume a vertical position within the contour of the frame and to the rear of the free ends of the arms; and a fixed table upon the frame, the fixed table constituting means for holding the arms of the frame against separation, the fixed table being to the rear of the movable table when the latter is horizontal, the two being then alined, each of the tables being of an extent sufficient to support approximately one-half of the table-held wheel, independently of the other table.

In testimony that I claim the foregoing as my own, I have hereto affixed my signature in the presence of two witnesses.

CHARLES B. SWIFT.

Witnesses:
 JOHN R. SMITH,
 IVAN ARNOLD.

---

Copies of this patent may be obtained for five cents each, by addressing the "Commissioner of Patents, Washington, D. C."